Sept. 2, 1952  J. W. McDONALD  2,608,989
PIERCING VALVE
Filed Feb. 24, 1949

J. W. McDonald
INVENTOR

BY *CA Snow & Co.*
ATTORNEYS.

Patented Sept. 2, 1952

2,608,989

UNITED STATES PATENT OFFICE 2,608,989

PIERCING VALVE

John W. McDonald, Grampian, Pa.

Application February 24, 1949, Serial No. 78,167

3 Claims. (Cl. 137—318)

This invention relates to valve construction, and more particularly, has reference to a piercing valve.

By way of background, it may be noted that many conditions can exist under which it is desired to tap into a line and provide a valve at the location at which the line is tapped. It often happens that the tapping and valve mounting operation has the disadvantage under normal practice of causing loss of fluid contained in the line. The operation may have the added disadvantages of requiring an excessive amount of time and effort, increasing the possibilities of leaks, etc.

For example, in the art of refrigerator repair, the repairman often is required to work upon a hermetically sealed refrigerator unit having no valves for servicing other units. Heretofore, this has required cutting of the tubing and installation of a valve, which in turn requires the making of flared connections, loss of vital time, increases the possibility of leaks, causes loss of all refrigerant, and in addition may cause air and moisture to enter the system.

To this end, I have provided a piercing valve arrangement which is designed to make it possible for the average refrigerator repair man to check and service any hermetically sealed unit at less cost, and with the expenditure of less time, the valve being particularly designed, in fact, to permit the service man to perform many servicing tasks which heretofore have been incapable of ready achievement.

Another important object is to provide a piercing valve which can be used in other fields of work, such as the tapping of air, gas, and other fluid lines.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
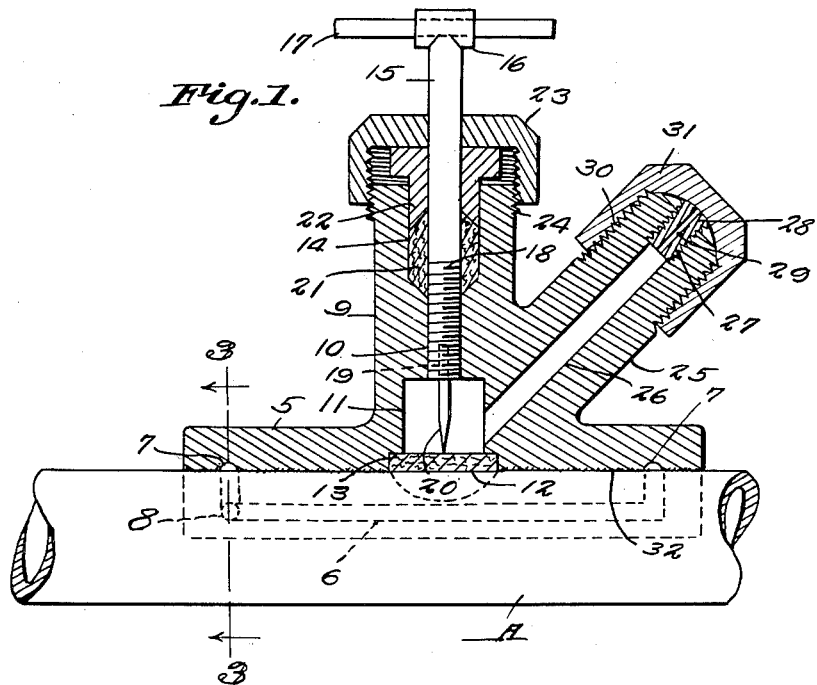
Figure 1 is a longitudinal section through a piercing valve constructed in accordance with the invention as it appears when mounted upon a portion of tubing prior to piercing of the tubing by the valve.

Referring to the drawings in detail, a saddle 5 is in the present instance of generally elongated conformation and is curved transversely conformably to the external curvature of tubing A to be tapped.

On the inner surface of the saddle 5 adjacent the opposite longitudinal edges thereof, are formed the elongated parallel solder grooves 6 the ends of which are bridged by the transverse grooves 7. At one end of each groove 6 a vent 8 is provided extending from said groove to the outer surface of the saddle 5.

Integral with the saddle 5 and extending upwardly from the middle portion thereof is the valve body 9 having the axial threaded bore 10, said bore 10 opening at the lower end of the body into an enlarged recess 11. Normally closing said recess is the fibre disc 12, that can be fitted into an enlarged portion 13 of the recess. The fibre disc 12 is flush with the interior surface of the saddle 5.

At the upper end of the body 9, the threaded bore 10 opens into a packing recess 14.

Threadable in the bore 10 is the elongated piercing shaft 15 having at its upper end the apertured cross member 16 receiving the cross pin 17 for the purpose of rotating the shaft 15.

At its lower end, the shaft 15 is threaded for engagement in the threaded bore 10, as at 18, and formed in the inner end face of the piercing shaft 15 is the socket 19 receiving the needle 20 extending into the recess 11 and normally terminating short of the fibre disc 12 as particularly shown in Figure 1. Needle 20 is preferably secured in the socket 19 by silver soldering or the like.

For the purpose of preventing leaks through the bore 10 I provide the packing 21 that is disposed in the packing recess 14, said packing being secured in place by the packing retainer 22 over which is fitted the packing nut 23 threadable on the externally threaded upper end 24 of the body 9.

Formed integrally with the body 9 in an angular boss 25, having the axial bore 26 which at its inner end is in communication with the recess 11 and which at its outer end opens at the outer end of the boss. The outer end of the bore 26 can be enlarged and threaded as at 27 to receive a threaded adapter or regulating jet 28 having the reduced bore 29.

Said outer end of the boss 25 is externally threaded as at 30 to receive the sealing cap 31, In use, and assuming that tubing A comprising a portion of a hermetically sealed refrigerating unit, is to be tapped for servicing operations, said tubing A first is cleaned and tinned. Then, a suitable flux is applied to the tinned surface of said tubing A. It will be understood that the inner or pipe engaging surface of the saddle 5 will previously have been tinned.

The saddle 5 is then applied to the tubing A, and said saddle and tubing are heated with a torch or iron until the solder 32 fluxes. If necessary to add more solder, this can be added to the joint through the vents 8.

When the saddle has been properly secured to the tubing 13, the sealing cap 31 is removed. Assuming that a refrigerator unit is being serviced, the charging line or other line to be connected in communicating relation with the tubing A is coupled to the boss 25, with the regulating jet 28 being used or not used, depending upon the particular conditions or operation.

Figure 2:
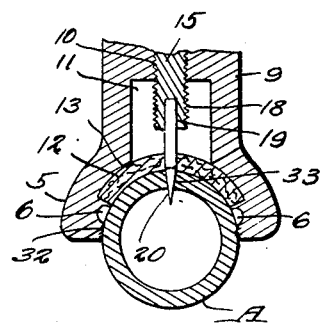
Figure 2 is a transverse section through the medial portion of the valve, showing the tubing pierced thereby.
Figure 3:
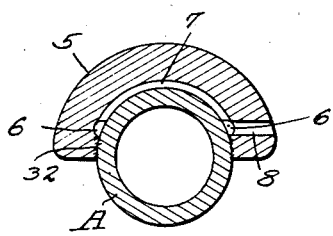
Figure 3 is a transverse section taken substantially on line 3—3 of Figure 1.

The piercing shaft 15 is then rotated, so that the piercing needle 20 is moved downwardly to the position illustrated in Figure 2, in which position it has pierced the tubing A.

As a result, the needle 20 forms a seat 33 for itself in the tubing A. Retrograde threading of the shaft 15, accordingly, opens the valve, for the servicing operations. After the operations have been performed, the valve is again moved into its seat, so as to close the aperture, effectively sealing the aperture until such time as further servicing operations may be required.

The charging line, not shown, now may be removed, and the sealing cap 31 reapplied.

It will be understood that during the operation of soldering the saddle to the tubing, any ordinary clamps, such as wire clamps or similar devices, are used to hold the saddle in proper position.

Important characteristics of the construction reside in its simplicity, ease of operation, and the characteristic possessed whereby it prevents loss of refrigerant or other fluid, reduces the chances of leaks caused by vibration, and eliminates the cutting of the tubing resulting in loss of said fluid.

What is claimed is:

1. A conduit tapping valve adapted for mounting on an elongated length of tubular conduit, said valve comprising an elongated transversely concavo-convex saddle member adapted to receive a tubular conduit in the concave side thereof, a valve body carried by the saddle member and projecting perpendicularly from the convex side thereof, said valve body having a relatively large axial recess therein opening through the end thereof adjacent the saddle member, said saddle member having a bore opening through the concave side thereof and communicating with the recess, the bore being of greater diameter than the recess to form a shoulder at the junction of the bore and the recess, a sealing disc of fibrous material in the bore and seated against the shoulder, a valve stem threaded axially through the valve body and entering the recess, a piercing needle carried by the valve stem within the recess, and said valve body having a laterally extending bore extending therethrough and communicating with the recess.

2. A conduit tapping valve adapted for mounting on an elongated length of tubular conduit, said valve comprising an elongated transversely concavo-convex saddle member adapted to receive a tubular conduit in the concave side thereof, a valve body carried by the saddle member and projecting perpendicularly from the convex side thereof, said valve body having a relatively large axial recess therein opening through the end thereof adjacent the saddle member, said saddle member having a bore opening through the concave side thereof and communicating with the recess, the bore being of greater diameter than the recess to form a shoulder at the junction of the bore and the recess, a sealing disc of fibrous material in the bore and seated against the shoulder, a valve stem threaded axially through the valve body and entering the recess, a piercing needle carried by the valve stem within the recess, a stem carried by the valve body and projecting outwardly therefrom, said stem having an axial bore extending therethrough and communicating with the recess, a regulating jet threadedly engaging the wall of the bore in the stem adjacent the end thereof remote from the recess, and a cap threadedly engaging the stem adjacent the end thereof adjacent the regulating jet for closing the bore in the stem.

3. A conduit tapping valve adapted for mounting on an elongated length of tubular conduit, said valve comprising an elongated transversely concavo-convex saddle member adapted to receive a tubular conduit in the concave side thereof, a valve body carried by the saddle member and projecting perpendicularly from the convex side thereof, said valve body having a relatively large axial recess therein opening through the end thereof adjacent the saddle member, said saddle member having a bore opening through the concave side thereof and communicating with the recess, the bore being of greater diameter than the recess to form a shoulder at the junction of the bore and the recess, a sealing disc of fibrous material in the bore and seated against the shoulder, a valve stem threaded axially through the valve body and entering the recess, a piercing needle carried by the valve stem within the recess, said valve body having a laterally extending bore extending therethrough and communicating with the recess, the saddle member having an endless groove in its concave side, and said groove encircling the bore in the saddle member in spaced relation thereto.

JOHN W. McDONALD.

REFERENCES CITED

The following references are of record in the file of this patent:

UNITED STATES PATENTS

| Number | Name | Date |
| --- | --- | --- |
| 273,031 | Cowles | Feb. 27, 1883 |
| 577,462 | Stewart | Feb. 23, 1897 |
| 1,163,355 | Meloon | Dec. 7, 1915 |
| 1,172,298 | Morris | Feb. 22, 1916 |
| 1,828,763 | Carnes | Oct. 27, 1931 |
| 1,890,998 | Lindquist | Dec. 13, 1932 |
| 1,933,915 | Lindquist | Nov. 7, 1933 |
| 2,009,392 | Demmler | July 30, 1935 |